Dec. 16, 1969   R. C. REMPEL   3,484,715
TEMPERATURE COMPENSATING MOUNTING FOR LASER REFLECTORS
Filed April 21, 1966
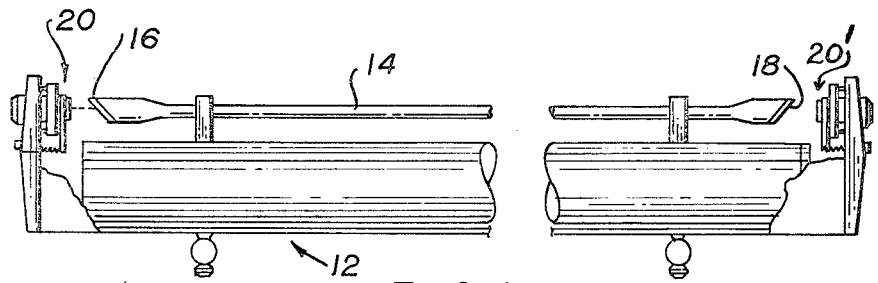
FIG. 1
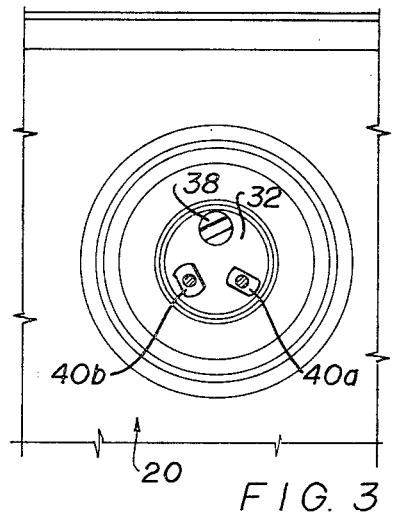
FIG. 3
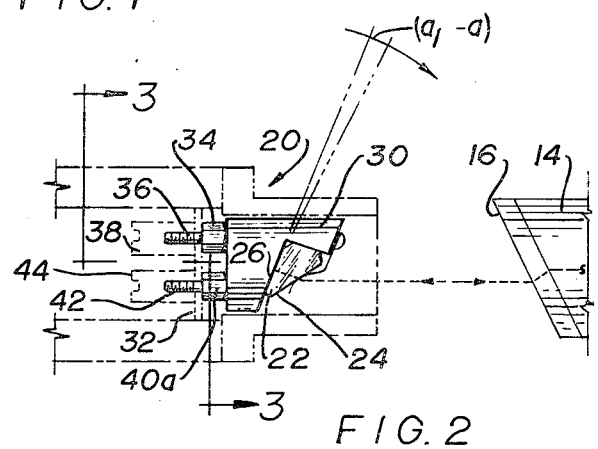
FIG. 2
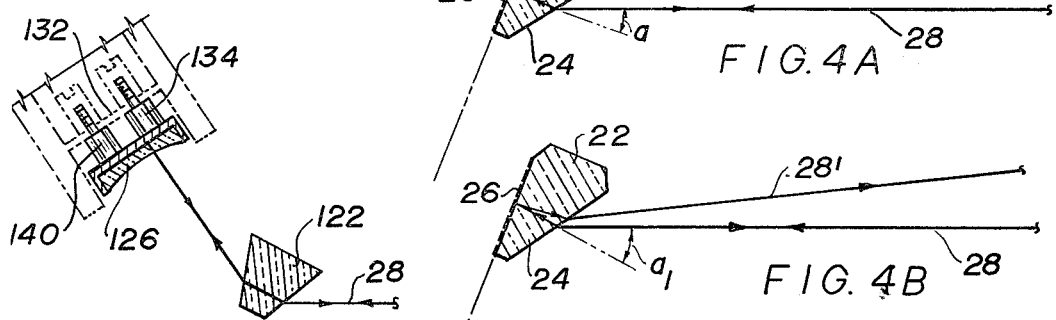
FIG. 4A
FIG. 4B
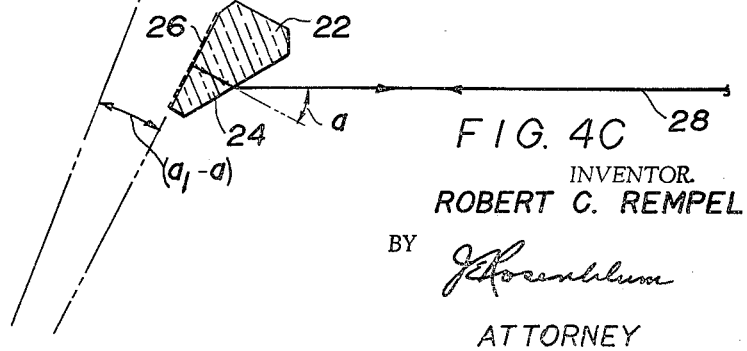
FIG. 5
FIG. 4C
INVENTOR.
ROBERT C. REMPEL
BY
ATTORNEY

3,484,715
TEMPERATURE COMPENSATING MOUNTING FOR LASER REFLECTORS

Robert C. Rempel, Los Altos, Calif., assignor to Spectra-Physics, Inc., Mountain View, Calif., a corporation of California
Filed Apr. 21, 1966, Ser. No. 544,240
Int. Cl. H01s 3/00; G02f 7/00
U.S. Cl. 331—94.5                        9 Claims

ABSTRACT OF THE DISCLOSURE

A laser in which a dispersive prism is associated with one of the resonator reflectors to establish a wavelength selective resonator alignment. This reflector is supported by a temperature-responsive mounting which rotates the reflector to compensate for temperature-dependent changes in the index of refraction of the prism, thereby maintaining the alignment of the resonator at the selected wavelength under varying temperature conditions.

---

The present invention relates in general to lasers, and more particularly to a wavelength-selective laser resonator having an alignment which is insensitive to ambient temperature changes.

The two basic components of a laser are an active medium in which optical radiation is generated and amplified and an optical resonator, comprising a plurality of reflectors (or mirrors), which repeatedly reflects radiation of a desired wavelength through said active medium a sufficient number of times to build up self-sustained oscillation at said desired wavelength.

Often the active medium is such as to generate radiation at other wavelengths which, if also repeatedly reflected through the active medium, can be amplified to an extent which causes interference with the desired oscillation. To avoid this, a dispersive element, such as a prism, is placed in the optical resonator so that the resonator is properly aligned only at the desired wavelength. The present invention is based on the discovery that temperature-dependent changes in the dispersion of the dispersive element can be sufficient to change this desired alignment of the resonator in use.

Consider, for example, a helium-neon gas laser in which a quartz prism is used to provide selective resonator alignment at the desired operating wavelength of 6328 A. The index of refraction of the prism at 6328 A. changes with temperature by an amount which changes the angular orientation of the 6328 A. beam approximately $10^{-5}$ radians per degree centigrade. Typically during the operation of the laser, the temperature environment of the prism changes by 5° C. resulting in an angular misalignment of $0.5 \times 10^{-4}$ radians. Since this misalignment is sufficient to reduce or quence the desired oscillation, an undesirable output instability is observed.

According to the present invention, the reflector associated with the dispersive element is mounted on a structure whose angular orientation changes with temperature by an amount which substantially compensates for temperature-dependent changes in dispersion, thereby maintaining the alignment of the resonator stable with changes in ambient temperature. This may readily be accomplished by mounting the reflector on a bimetallic structure.

The various features and advantages of the present invention will become more apparent upon a consideration of the following specification taken in connection with the accompanying drawing, wherein:

FIG. 1 is a partially schematic side elevation view of a gas laser employing the present invention;

FIG. 2 is a detailed view at enlarged scale of the optical element support structure of the present invention;

FIG. 3 is a cross-sectional view taken along line 3—3 of FIG. 2;

FIGS. 4A, 4B and 4C are diagrammatic views of the angular relationship of the optical element of FIG. 2 for varying temperature conditions within the laser structure, the size of the angles being exaggerated for purposes of illustration; and FIG. 5 is a schematic side view of another form of the invention;

Referring more particularly to the drawing, reference numeral 12 generally indicates a laser structure that includes a gas filled plasma tube 14 which when excited by an electromagnetic discharge source, not shown, generates optical energy. Such optical energy is directed outwardly of the longitudinal ends of plasma tube 14 through windows 16 and 18 inclined at Brewster's angle with respect to the longitudinal axis of the tube. Disposal in alignment with at least one of the windows, for example window 16, is an optical reflector assembly 20 which effects dispersion of the optical energy for plasma tube 14, the angle of dispersion varying with the wavelength of the beam impinging on the reflector assembly. Proper angular orientation of the reflective surface effects discriminating in favor of one desired wavelength, which wavelength is reflected back along the axis of plasma tube 14 and is repeatedly so reflected between reflector 20 and opposed reflector 20' so that laser oscillation at a desired frequency is caused to occur.

More specifically, and in rfeerence to FIG. 2, reflector assembly 20 includes a prism 22 having a light receiving face 24 in alignment with window 16 and a reflective surface 26 spaced therefrom and in light communication therewith through the prism. The prism angle (between the front and rear surfaces of the prism) is equal to the supplement of Brewster's angle. Because the light beam passing through prism 22 is deviated through an angle which varies inversely with the wavelength thereof, only a single wavelength portion of the light will impinge on mirror surface 26 normal thereto. Only the light that impinges on surface 26 normal thereto will be reflected back along optical axis 28 into plasma tube 14. Other wavelengths impinging on mirror surface 26 obliquely thereof will not be reflected back into the plasma tube sufficiently to interfere with operation at the desired wavelength. The foregoing phenomenon may be used to advantage in tuning the laser to a particular operating wavelength by adjusting the prism so that mirror surface 26 reflects perpendicularly the wavelength at which it is desired to drive the laser.

The index of refraction of prism 22 is different from that of the air intermediate window 16 and the prism. As a consequence of such difference and is view of Snell's law, light entering the prism is angularly deflected, the angle varying directly with the index of refraction of the prism. The index of refraction varies with temperature. Because substantial heat is generated in driving plasma tube 14, the index of refraction, and therefore the angle at which a given optical wavelength is deflecteed by prism 22, varies signficantly during operation of the laser apparatus.

Referring to FIG. 4A, assume that an optical beam emanating from plasma tube 14 along optical axis 28 impinges on surface 24 of prism 22 and is deflected through an angle $a$, the magnitude of which depends on the index of refraction of the prism and the wavelength of the beam. Assume further, that the prism is so oriented that reflective surface 26 is normal to a selected wavelength portion of the deflected beam and therefore reflects energy at the selected wavelength back along the optical axis and into the plasma tube. The condition depicted in FIG. 4A is the desired condition and permits laser oscillation at a desired wavelength.

FIG. 4B indicates schematically the consequence of a change in the index of refraction of prism 22 arising from an increase of temperature of the prism. Beam 28 is deflected by the prism at an angle $a_1$, greater than angle $a$, and thus impinges on mirror surface 26 at an oblique angle from which it is reflected along a path 28' and away from the optical axis of plasma tube 14. The condition depicted in FIG. 4B, if not compensated, can reduce or extinguish laser oscillations at the desired wavelength.

In respect to FIG. 4C, assume that the temperature is the same as in FIG. 4B and, assume further, that prism 22 has been rotated clockwise through an angle $(a_1-a)$ so that beam 28 is again deflected through angle $a$. Thus, the beam of desired wavelength will impinge upon mirror surface 26 normal thereto and be reflected back into plasma tube 14 along the optical axis thereof, as is required for stable oscillation at the desired wavelength.

In the embodiment shown in more detail in FIGS. 2 and 3, the physical rotation of mirror surface 26 with temperature is accomplished by mounting prism 22 on a block 30, which block is attached to a mounting plate 32 carried in assembly 20 by means of a brimetallic mounting structure. The bimetallic structure includes a first spacer 34 formed of a material having a relatively high coefficient of thermal expansion (e.g. aluminum), which spacer is rigid with mounting block 30 and is provided with a threaded portion 36 which extends through a complementary hole in plate 32 and is there secured by a nut 38. Second and third spacers 40a and 40b, formed of material with a relatively small coefficient of thermal expansion (e.g. invar), are provided with threaded portions 42 extending through complementary holes in plate 32 and there retained by nuts 44. With the onset of increased temperature, spacer 34 expands a greater amount than spacers 40a and 40b so that reflective surface 26 is moved through the angle $(a_1-a)$, see FIGS. 4B and 4C. Should the temperature decrease, an opposite phenomenon occurs so that mirror surface 26 is at all times oriented so as to reflect the desired wavelength along the optical axis of the plasma tube. The particular dimensions of spacers 34, 40a and 40b depend on such parameters as the coefficient of thermal expansion of the material of which they are formed, their physical dimensions, and the relation, of the index of refraction of prism 22 to the temperature thereof; specific magnitudes for these parameters are well within the competence of the skilled artisan and are not set forth in detail herein.

As will appear from FIGS. 2 and 3, spacer 34, having a relatively large thermal coefficientt of expansion, is disposed on the side of mirror surface 26 toward which a beam entering the prism is angularly displaced with increasing temperature so as to effect compensation in the appropriate direction. The showing in FIG. 3 of spacers 34, 40a, and 40b in a generally equilateral triangular configuration in which a theoretical line extending from spacer 38 to the midpoint of a theoretical line between spacers 40a and 40b is oriented in coplanar relationship with a normal to prism surface 24, affords a stable structure. Other arrangements and numbers of the spacers will occur to those skilled in the art.

In FIG. 5 a prism 122 that has a temperature dependent index of refraction is used in conjunction with a spaced-apart mirror 126. The mirror 126 is angularly disposed so that only the desired wavelength will be reflected back through prism 122 to the plasma tube. Mirror 126 is mounted to a rigid plate 132 by spacer members 134 and 140 which correspond respectively to spacers 34 and 40a in FIG. 2, a spacer member corresponding to spacer 40b being present in the structure of FIG. 5 but being obscured by spacer 140. Mirror 126 and the spacers are mounted in the same temperature environment as prism 122 so that, as the index of refraction of a prism varies, the angular orientation of the mirror will vary to maintain the output wavelength of the laser at a desired value. So that both prism-air interfaces are at Brewster's angle to the light beam, the prism 122 has a prism angle which is twice that of prism 24 in the embodiment of FIGS. 2 and 3; thus the temperature-dependent angular variations of the beam are twice as great and the bimetallic compensation is designed to have twice the temperature sensitivity, as by doubling the length of the spacers (134 and 140).

Thus, it will be seen that the invention provides a reflector mounting apparatus that compensates for variations in temperature dependent optical parameters so as to afford stable operation of the laser throughout the entire range of operating temperature of the system. In one laser designed according to the present invention, a 10 to 1 improvement in output stability was realized as compared to similar lasers without temperature compensated mirror mounts. Moreover, the structure of the present invention is extremely rugged and uncomplex so that the accuracy thereof is high and long lasting.

Although two embodiments of the present invention have been shown and described, it will be apparent that other adaptations and modifications can be made without departing from the true spirit and scope of the invention.

What is claimed is:

1. A laser, comprising: an active medium; optical resonator means for repeatedly reflecting optical radiation through said active medium, and for effecting dispersion of said optical radiation to select a desired wavelength said resonator means including at least one reflector upon which said optical radiation is incident at an angle which varies as a function of temperature; and means for supporting said at least one reflector, said supporting means including temperature-responsive means for rotating said reflector by an amount which compensates for the temperature-dependent variations in the angle at which said optical radiation is incident upon said reflector.

2. A laser according to claim 1 wherein said reflector supporting means comprises a base, at least first and second members joining said reflective element to said base, said first member having a thermal coefficient of expansion greater than said second member, and said first member being spatially related to said second member so that said reflector pivots relative said base in response to temperature variations.

3. A laser according to claim 1 including means dispersing optical radiation generated by said active medium for selectively transmitting radiation of said desired wavelength to said reflector at an incident angle which permits repeated reflection through said active medium.

4. A laser according to claim 3 wherein the angle at which said desired optical radiation is transmitted varies with the temperature of said dispersing means.

5. A laser according to claim 4 wherein said reflector supporting means includes a bimetallic structure for supporting the reflector, said bimetallic structure being mounted in the same temperature environment as said dispersing means and being adapted to angularly position said reflector in response to varying temperature so that said desired radiation impinges on said reflector at substantially the same incident angle for all operating temperatures of the laser.

6. A laser according to claim 5 wherein said bimetallic supporting structure comprises a first spacer member having a relatively high thermal coefficient of expansion and second and third spacer members having a relatively low thermal coefficient of expansion, said first member being attached to said reflector at a region thereof toward which said desired optical radiation is deflected in response to increasing temperature, said second and third members being disposed opposite said first member and being mounted symmetrically relative the direction of thermal displacement of said optical radiation.

7. A laser according to claim 4 wherein said reflector supporting means comprising first and second members attached to said reflector, said members being disposed in the same temperature environment as said dispersing means, said first supporting member having a thermal coefficient of expansion greater than that of said second member, and said reflector being oriented relative to the desired optical radiation so that the differential thermal expansion of said members angularly positions said reflector to compensate for thermally-caused variations in the angle at which said radiation is transmitted by said dispersing means.

8. A laser according to claim 7 wherein said first reflector supporting member comprises an aluminum spacer and wherein said second reflector supporting member comprises a pair of invar spacers spaced from one another and from said aluminum spacer, said spacers being disposed in a generally equilateral triangular configuration, said aluminum spacer being attached to said reflecting means at a region thereof toward which said desired optical radiation is displaced in response to increased temperature.

9. A laser according to claim 4 wherein said dispersing means is a prism located between said active medium and said reflector, the index of refraction of said prism varying with temperature, and said rotating means maintains the reflecting surface of said reflector normal to said desired optical radiation whereby said desired optical radiation is reflected back in the same direction as it was transmitted.

References Cited

UNITED STATES PATENTS

| | | | |
|---|---|---|---|
| 1,325,936 | 12/1919 | Fouasse | 350—253 |
| 3,252,110 | 5/1966 | Gustafson et al. | |
| 3,311,843 | 3/1967 | Friedl | 331—94.5 |
| 3,329,060 | 7/1967 | Holleran | 356—135 |
| 3,404,352 | 10/1968 | Bowness | 331—94.5 |

FOREIGN PATENTS 984,590   2/1965   Great Britain.

RONALD L. WIBERT, Primary Examiner

T. MAJOR, Assistant Examiner

U.S. Cl. X.R.

350—287